United States Patent
Scholz et al.

(10) Patent No.: US 10,665,871 B2
(45) Date of Patent: May 26, 2020

(54) FUEL CELL STACK HAVING BIPOLAR PLATES, AND FUEL CELL SYSTEM

(71) Applicants: AUDI AG, Ingolstadt (DE); Volkswagen AG, Wolfsburg (DE)

(72) Inventors: Hannes Scholz, Braunschweig (DE); Jan-Philipp Brinkmeier, Braunschweig (DE); Daniel Grundei, Braunschweig (DE); Christian Lucas, Braunschweig (DE); Christian Schlitzberger, Schonebeck (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 191 days.

(21) Appl. No.: 15/775,803

(22) PCT Filed: Nov. 14, 2016

(86) PCT No.: PCT/EP2016/077616
§ 371 (c)(1),
(2) Date: May 11, 2018

(87) PCT Pub. No.: WO2017/085030
PCT Pub. Date: May 26, 2017

(65) Prior Publication Data
US 2018/0331374 A1    Nov. 15, 2018

(30) Foreign Application Priority Data
Nov. 16, 2015 (DE) .................. 10 2015 222 552

(51) Int. Cl.
*H01M 8/0265* (2016.01)
*H01M 8/04119* (2016.01)
*H01M 8/04291* (2016.01)
*H01M 8/0258* (2016.01)
(Continued)

(52) U.S. Cl.
CPC ....... *H01M 8/0265* (2013.01); *H01M 8/0258* (2013.01); *H01M 8/04119* (2013.01);
(Continued)

(58) Field of Classification Search
CPC .............. H01M 8/0265; H01M 8/258; H01M 8/04119; H01M 8/04126; H01M 8/04156; H01M 8/04291
See application file for complete search history.

(56) References Cited

U.S. PATENT DOCUMENTS 6,503,653 B2 * 1/2003 Rock .................. H01M 8/0228
429/434
8,021,792 B2 9/2011 Lamm
(Continued)

FOREIGN PATENT DOCUMENTS

DE 10346594 A1 5/2005
DE 102016208873 A1 * 11/2017 ........ H01M 8/04126
(Continued)

OTHER PUBLICATIONS

Machine translation of DE 10346594 (no date).*
Machine translation of WO 2017/085030 (no date).*

*Primary Examiner* — Amanda C. Walke
(74) *Attorney, Agent, or Firm* — Seed IP Law Group LLP

(57) ABSTRACT

The invention relates to a fuel cell stack having bipolar plates (10), each of which has two separator plates (12, 14) with an active region (16) and two distribution regions (18, 20) with main gas ports (22, 24) as well as a coolant main port (26), wherein the separator plates (12, 14) are formed and arranged one over the other in such a way that the respective bipolar plate (10) has separate channels (28, 30, 32) for the reaction gases and the coolant that connect the main gas port (22, 24) for the reaction gases and the coolant main port (26) of the two distribution region (18, 20) to each other.

(Continued)

Figure 1:
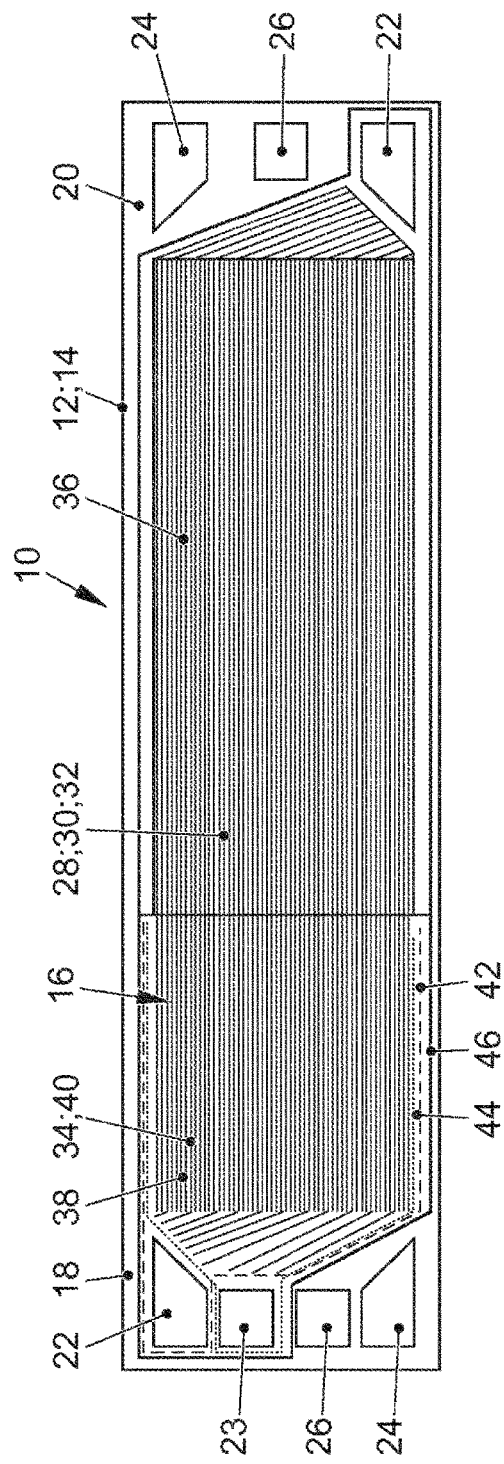

It is provided that the channels (28) for a reaction gas have an impermeable first dividing plate (38) in an inlet area (40) of the active area (16) that separates the channels (28) into two volume areas (58, 60), and in that a second main gas port (23) is provided adjacent to the first main gas port (22) in a distribution region (18) in order to supply the reaction gas. The subject matter of the invention is also a fuel cell system that has a fuel cell stack according to the invention.

15 Claims, 2 Drawing Sheets

(51) Int. Cl.
 *H01M 8/1018* (2016.01)
(52) U.S. Cl.
 CPC ... *H01M 8/04126* (2013.01); *H01M 8/04156* (2013.01); *H01M 8/04291* (2013.01); *H01M 2008/1095* (2013.01)

(56) References Cited

U.S. PATENT DOCUMENTS

| | | | |
|---|---|---|---|
| 9,343,756 B2* | 5/2016 | Oh | H01M 8/0258 |
| 2003/0091880 A1* | 5/2003 | Joos | H01M 8/04029 |
| | | | 429/415 |
| 2009/0197134 A1 | 8/2009 | Blank | |
| 2014/0356739 A1* | 12/2014 | Kuroha | H01M 8/04119 |
| | | | 429/413 |
| 2017/0149071 A1* | 5/2017 | Dickson | H01M 8/0258 |
| 2018/0248204 A1* | 8/2018 | Scholz | H01M 8/0204 |

FOREIGN PATENT DOCUMENTS

| | | |
|---|---|---|
| WO | 2002/054507 A1 | 7/2002 |
| WO | 2012/143781 A1 | 10/2012 |

* cited by examiner

FUEL CELL STACK HAVING BIPOLAR PLATES, AND FUEL CELL SYSTEM

The invention relates to a fuel cell stack having bipolar plates, each of which has two profiled separator plates, each of which in turn has an active area, as well as two distribution areas, each with main gas ports for the supply and removal of reaction gases to/from the active area, as well as a coolant main port for the supply and removal of coolant to/from the active area, wherein the separator plates are formed and arranged one over the other in such a way that the respective bipolar plate has separate channels for the reaction gases and the coolant that connect the main gas ports for the reaction gases and the coolant main port of the two distribution areas to each other, wherein the channels for the reaction gases are each bounded by a surface of a separator plate and a surface of a gas diffusion layer, as well as a fuel cell system.

Fuel cells use the chemical conversion of a fuel with oxygen into water in order to generate electrical energy. For this purpose, fuel cells contain as core component so-called membrane electrode assemblies (MEA) which are a combination of an ion-conductive, in particular proton-conductive, membrane and of an electrode (anode and cathode) respectively arranged on both sides of the membrane. Additionally, gas diffusion layers (GDL) may be arranged on both sides of the membrane electrode assembly on the sides of the electrodes facing away from the membrane. Generally, the fuel cell is constituted by a plurality of MEAs arranged in a stack, the electrical power outputs of which add up. During operation of the fuel cell, the fuel, in particular hydrogen $H_2$ or a gas mixture containing hydrogen, is guided to the anode where an electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gas-tight and electrically insulated manner (in a water-bound or water-free manner). The electrons provided at the anode are guided to the cathode via an electrical line. The cathode is supplied with oxygen, or a gas mixture containing oxygen, so that a reduction of $O_2$ to water $H_2O$ with a gain of protons and electrons takes place.

The fuel cell is formed by a plurality of membrane electrode assemblies arranged in a stack, which is why this is also referred to as a fuel cell stack. A bipolar plate is arranged between each two membrane electrode assemblies, ensuring that the individual cells receive the operating media, i.e. the reactants and a coolant. In addition, the bipolar plates ensure an electrically conductive contact to the membrane electrode assemblies. Furthermore, they guarantee a sealed separation between anode and cathode chamber.

In most cases, the bipolar plates are constructed of two profiled electrically conductive separator plates that have a structure in the form of an elevation profile arranged on both sides of the plates. This profile results in more or less discrete channels on both sides of the plates, which are designed to guide the operating media. The operating media are in turn separated by the plates so that coolant is guided in the interior of the plate while the reaction gases are guided outside the plate. The channels of the reaction gases are bounded on the one hand by the respective plate and on the other by a gas diffusion layer.

For controlling the water supply with respect to the reaction gases in the bipolar plates to increase the power density, efficiency and service life of the fuel cell, it has been proposed in WO 2012/143781 A1 and US 20090197134 A1, inter alia, to incorporate a plurality of metal strips made of titanium in the channel for the reaction gas to be humidified—but this is expensive and complex to produce because they are difficult to affix and position—or to incorporate a perforated metal plate in the channel, which is also expensive and complex to produce. In addition, these solutions cannot be used in combination with graphite bipolar plates.

It is further known from the prior art to bring a reaction gas to a defined humidity via a humidifier that is already outside of a fuel cell stack.

The objective of the invention is then to provide a fuel cell stack having bipolar plates as well as a fuel cell system that enables control of the water supply to the reaction gases in a simple and economical manner.

This objective is achieved via a fuel cell stack having bipolar plates, each of which has two profiled separator plates, each of which in turn has an active area, as well as two distribution areas, each having two main gas ports for the supply and removal of reaction gases to/from the active area, as well as a coolant main port for the supply and removal of coolant to/from the active area, wherein the separator plates are formed and arranged one over the other in such a way that the respective bipolar plate has separate channels for the reaction gases and the coolant. The channels connect the main gas ports for the reaction gases and the coolant main port of the two distribution areas to each other, wherein the channels for the reaction gases are each bounded by a surface of a separator plate and a surface of a gas diffusion layer. According to the invention, the channels for one of the reaction gases have an impermeable first dividing plate that, in an inlet area of the active area, separates each of the channels in the inlet area into two volume areas and extends in the direction of flow of the reaction gas, wherein only one volume area is adjacent to the channels of the gas diffusion layer. Furthermore, it is provided according to the invention that a second main gas port is arranged next to the first main gas port in a distribution area in order to supply the reaction gas to the channels that are subdivided into two volume areas, wherein the volume area adjacent to the gas diffusion layer is connected to the first main gas port, and the volume area that is not adjacent to the gas diffusion layer is connected to the second main gas port.

Thanks to the design according to the invention of the one distribution area having two main gas ports for a reaction gas, preferably air, it is advantageously possible to supply the volume area adjacent to the gas diffusion layer with air that is already humidified, whereas dry, dehumidified reaction gas, preferably air, is supplied through the other main gas port so that the humidified air that is in contact with the gas diffusion layer has a suitable humidity from the outset.

Also claimed is a fuel cell system that has at least one humidifier for at least one reaction gas, wherein the humidifier(s) can advantageously be configured smaller than usual, because only a partial quantity of the total amount of reaction gas employed needs to be humidified.

The dividing plate is preferably sealed against the corresponding separator plate and against a membrane electrode assembly (MEA) of which the gas diffusion layer is a component in such a way that the humidified reaction gas advantageously remains separate from the dry reaction gas, or, respectively, the humidified air from the dry air, thereby maintaining the humidity level set via the humidifier at the start of the active area.

According to one embodiment of the invention, the channels for both reaction gases may each be equipped with a dividing plate. These are preferably different, because the different reaction gases create different requirements for their design. Accordingly, a second main gas port is also provided for the second reaction gas so that the volume areas formed by the dividing plate are supplied by different main gas ports. The humidifier of the fuel cell system and its interconnection must be adapted accordingly. If necessary, a second humidifier is to be provided.

Because of the impermeable dividing plate, this design according to the invention makes it possible for the water passing through the gas diffusion layer to only humidify the portion of the reaction gas that already has a desired humidity. This part is naturally located in the area of the channel adjoining the gas diffusion layer.

The design of a fuel cell stack according to the invention is advantageously suitable for the use of metallic or graphite bipolar plates.

Preferably, the dividing plate does not extend over more than half of the length of the channels for the reaction gas because after this section, there is typically sufficient humidification of the reaction gas.

According to a preferred embodiment, at least one additional impermeable dividing plate is arranged in the channels, preferably 2 to 4, especially preferably 2 to 3 dividing plates. These are spaced from one another such that at this point, a mixing of the two volume flows of the reaction gas can take place in order to avoid an excess humidification of the reaction gas and an excess depletion of the reactants because of the electrochemical reactions that take place. After the distance or the gap between two dividing plates, the humidification level may increase again, before it is reduced again by the next gap. In this way, a relatively uniform humidification can be achieved over the entire length of the channels. The distance between two successive dividing plates is to be selected such that a mixing of both volume flows can take place. For this reason, the distance should be a multiple of the channel depth.

A corresponding effect can be achieved by the following dividing plates preferably having a shorter length than the respectively preceding dividing plate.

In order to not cause pressure differences in the channel, the at least one dividing plate is preferably aligned in parallel to the gas diffusion layer.

The design of the at least one partition plate for the channels depends on the specific requirements of the particular fuel cell system.

The cross-sections of the two volume areas may be different. Crucial is a design of the shape and length of the at least one dividing plate corresponding to the design goals that takes into account the humidity curve, pressure losses and reactant consumption (reaction gases). In the process, it must be kept in mind that the smaller the volume flow flowing in the volume area adjoining the gas diffusion layer GDL, the shorter the channel section separated by the dividing plate must be.

Therefore, the at least one dividing plate can have a flat or three-dimensional configuration in order to design or to dimension the volume areas in the desired manner. In doing so, it must be kept in mind that the volume flows should not be designed to be too small. Moreover, the height of the volume area that is adjacent to the gas diffusion layer must measure as high as possible because the respective separator plate presses into it up to a certain degree so that the height of the volume area can be decreased again.

Accordingly, at least one separator plate may also be formed so that the combination with the design of the at least one dividing plate results in additional possibilities for adjusting the volume flows of the reaction gas(es) (with different water content) and of a coolant.

Moreover, it is preferred that the channels run predominantly in a straight line in order to suppress unwanted swirling of the reaction gas which could possibly interfere with an even humidification.

It is preferred to design the channels for the transport of a cathode gas according to the invention and to provide a second main gas port. Such a configuration may, as already stated, also be advantageous for the channels for the transport of anode gas. Also, according to the invention, all channels, that is to say for the cathode and anode gas transport, can be designed in this way.

The membranes used in the fuel cell stacks according to the invention are preferably polymer electrolyte membranes.

The fuel cell stack or the fuel cell system can be used for mobile or stationary applications. In particular, it serves to supply power to an electric motor for driving a vehicle. Thus, the subject matter of the invention is also a fuel cell system having fuel cell stacks according to the invention as well as a vehicle with such a system.

A bipolar plate of the fuel cell stack according to the invention has in particular the advantage that, because of the straightness of the cathode channels, water discharge is facilitated, thereby mostly or completely suppressing a blockage of cathode channels due to water accumulation. Furthermore, all cathode channels are the same length because of the arrangement according to the invention. This in turn facilitates a homogeneous distribution of the pressure and volume flow of reaction gases.

A fuel cell stack according to the invention or a fuel cell system according to the invention advantageously has an optimized mass flow distribution with low pressure loss of the operating media, in particular of the coolant, over the individual bipolar plates, but also over the entire fuel cell stack. Moreover, the supply of water in the fuel cell stack can advantageously be improved so as to increase the power density, efficiency and service life of the fuel-cell.

Further preferred embodiments of the invention will become apparent from the remaining features mentioned in the dependent claims.

The various embodiments of the invention mentioned in this application may be combined advantageously with one another unless stated otherwise in individual cases.

Figure 2:
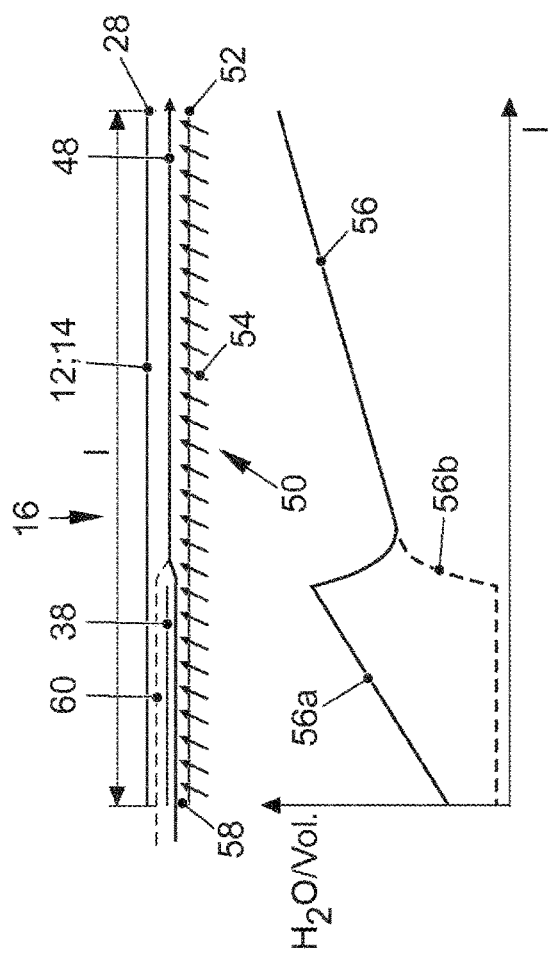
Figure 3:
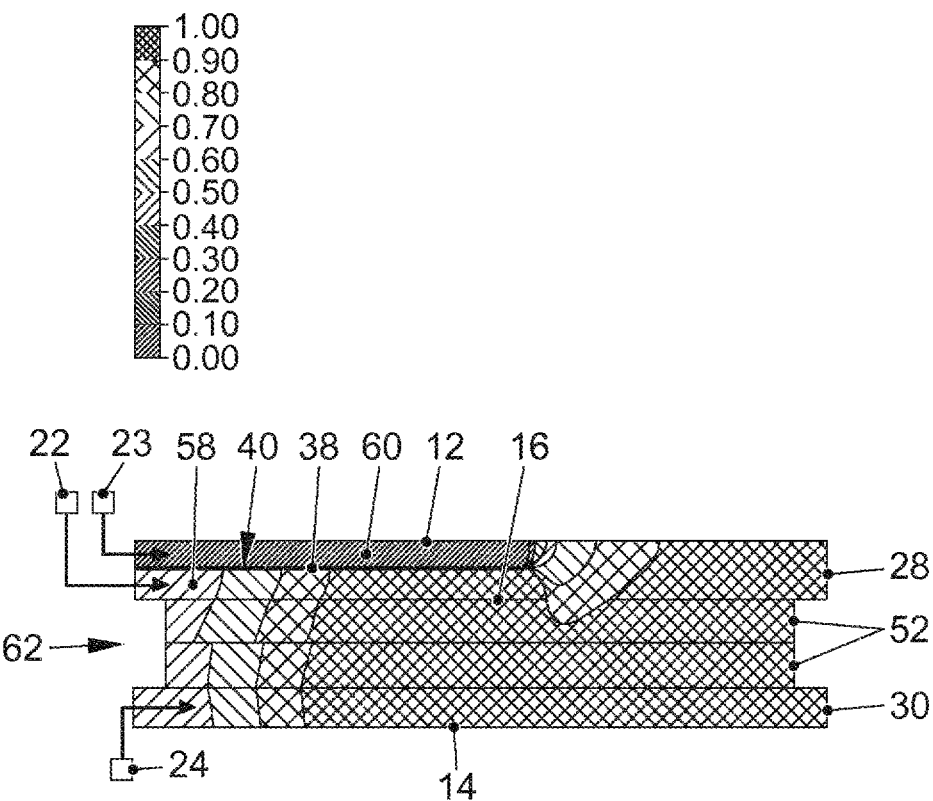
Figure 4:
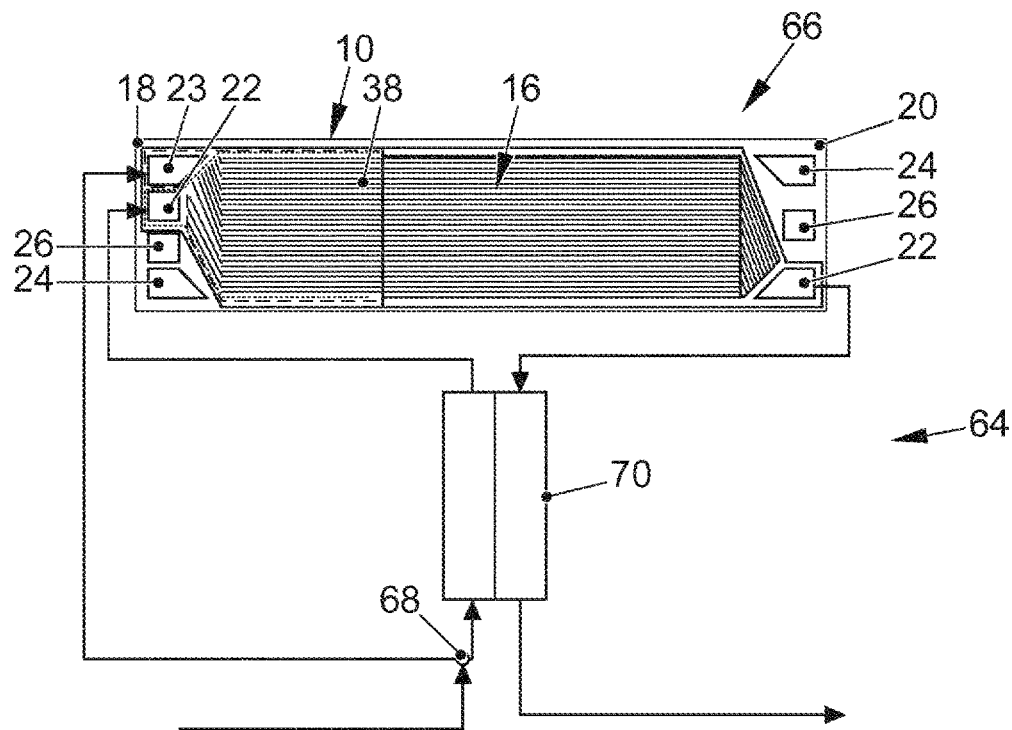

The invention is explained below in exemplary embodiments with reference to the respective drawings. The following is shown:

FIG. 1 the structure of a bipolar plate according to the invention in a schematic plan view, FIG. 2 in schematic views, a section of the structure of a bipolar plate according to the invention, and the path of the water content within a channel for a reaction gas, FIG. 3 a representation of a CFD simulation (computational fluid dynamics) of the relative humidity of the reaction gases in a membrane electrode assembly, and FIG. 4 in a schematic view, a fuel cell system according to the invention.

FIG. 1 shows a bipolar plate 10 designed according to the invention for a fuel cell stack according to the invention that is not shown.

The bipolar plate 10 has two profiled separator plates 12, 14, which together form an active area 16 adjacent on both sides to distribution areas 18, 20, each of which has two main gas ports 22, 24 for reaction gases and a main gas port 26 for a coolant, by means of which the reaction gases and the coolant are supplied to the active area 16. Moreover, one distribution area 18, in which the reaction gases are supplied, has a second main gas port 23 that is charged with the same reaction gas as a first main gas port 22, but the reaction gas for the first main gas port 22 is humidified and the reaction gas for the second main gas port 23 is not. Separate channels 28, 30, 32 run through the bipolar plate 10 for the reaction gases and the coolant, but are not shown here in detail. The active range 16 is in turn divided into two partial areas 34, 36, wherein in one partial area 34 the channels 28 for one of the reaction gases are provided with a dividing plate 38, which is not depicted in detail in FIG. 1, wherein this partial area 34 corresponds to the inlet area 40 of the corresponding reaction gas that is supplied via the two main gas ports 22, 23 in the active area 16.

The dividing plate 38 is sealed against the separator plate 12, 14 with a seal 42, which is depicted with a dashed line, and against a membrane electrode assembly (MEA) (not shown) with a seal 44, which is depicted by a dotted line. Moreover, the separator plate 12, 14 for the humidified and dehumidified reaction gas that is supplied has an additional seal 46 against the membrane electrode assembly (MEA), which is represented by a solid line.

FIG. 2 shows a longitudinal section through one of the channels 28 of the bipolar plate 10 for a reaction gas that is designed according to the invention, wherein the flow direction 48 is indicated by an arrow. From one side 50 of the channels 28 that, as is further explained below, is adjacent to a gas diffusion layer 52, product water 54, symbolized by arrows, penetrates thereinto, so that the reaction gas is additionally humidified.

The water content in the reaction gas ($H_2O$/vol.) is shown in a diagram by a curve 56 in relation to the length l of the active region 16.

The humidified reaction gas is introduced via the first main gas port 22, which is not depicted in FIG. 2, into the active area 16, but only in the volume area 58 between the dividing plate 38 and the gas diffusion layer 52. The dry reaction gas is introduced via the second main gas port 23, also not depicted here, into the active area 16, but only in the volume area 60 between dividing plate 38 and the separator plate 12, 14.

This design produces a split of the curve 56. This results in a partial curve 56a which is to be assigned to the volume area 58 of the canal 28 into which the humidified reaction gas flows. The other volume region 60 of the channel 28 shows a curve according to the partial curve 56b (dashed line).

While the partial curve 56a of the volume area 58 shows a sharp increase starting from the water content predetermined by the humidification as a result of the penetration of product water 54, the water content according to curve 56b of the other volume area 58 remains at a consistently low level because in this case no humidification by product water 54 occurs, and the reaction gas was introduced dry anyway.

As soon as the reaction gas of the channels 28 moves on from the dividing plate 38, the partial curves 56a and 56b quickly merge because the water content is distributed within the overall volume of the reaction gas. Subsequently, the curve 48 again shows a continuous increase of the water content due to the absorption of the product water 54 in the reaction gas.

FIG. 3 schematically shows the flow curve or the curve of the relative humidity of the reaction gases within a membrane electrode assembly (MEA) 62 with adjacent channels 28, 30 on the basis of a CFD simulation. The result of this simulation corresponds to the curve 56 from FIG. 2.

The humidified reaction gas is introduced via the first main gas port 22 into the active area 16 and ends up in the volume area 58 between dividing plate 38 and the gas diffusion layer 52. The relative humidity present at the outset continuously increases and corresponds to the humidity curve in the other layers of the MEA 62.

Past the end of the inlet area 40 with the dividing plate 38, there is a mixture of the humidified reaction gas with the dry reaction gas from the volume area 60. This has the consequence that the relative humidity of the gas that is in contact with the active region 16 decreases. The CFD simulation according to FIG. 3 shows that, despite the mixing of the dry or dehumidified reaction gas, the relative humidity in the active area of 16 (that is, in the layers of the MEA 62) remains at a high level which is necessary for a high efficiency during the conversion of the reaction gases.

FIG. 4 schematically shows a path 64 for a reaction gas in a fuel cell system 66. The reaction gas is divided by means of a bypass valve 68 into two volume flows, wherein one volume flow of the reaction gas is first supplied to a humidifier 70 and is humidified there. Subsequently, the humidified reaction gas is fed into the first main gas port 22. Parallel to this, the separated volume flow without humidification is supplied to the second main gas port 23, so that the two volume flows are separated from each other by the dividing plate 38 in the active area 16. The reaction gas occurring after the flow through the active area 16 from the main gas port 22 of the distribution area 20 to the discharge of the reaction gases is in turn supplied to the humidifier 70 in order to carry out an exchange of humidity. Subsequently, the reaction gas is supplied to the exhaust gas. The previously described supply and discharge of the reaction gases is carried out via a conduit system that is not described in further detail.

LIST OF REFERENCE SYMBOLS 10 bipolar plate
12, 14 Separator plates
16 Active area
18, 20 Distribution areas
22, 23 Main gas ports for a reaction gas, humidified and dehumidified
24 Main gas ports for a reaction gas
26 Main gas port for coolant
28, 30, 32 Channels for operating media
34, 36 Partial areas
38 Dividing plate
40 Inlet area
42, 44, 46 Seal
48 Direction of flow
50 Side
52 Gas diffusion layer
54 Product water
56 Curve
58, 60 Volume area
62 Membrane electrode assembly (MEA)
64 Section
66 Fuel cell system
68 Bypass valve 68
70 Humidifier
l Length

The invention claimed is:
1. A fuel cell stack comprising:
  gas diffusion layers; and
  bipolar plates, each bipolar plate including:
    an impermeable first dividing plate; and
    two profiled dividing plates, each profiled dividing plate having:

an active area,
two distribution areas, each distribution area including two main gas ports for supply and removal of reaction gases from the active area, and a coolant main port for supply of coolant to the active area and removal of coolant from the active area, and
a second main gas port provided in one of the two distribution areas, wherein:
the profiled dividing plates are formed and arranged one over the other such that the respective bipolar plate has separate channels for the reaction gases and the coolant that connect the main gas ports for the reaction gases and the coolant main port of the two distribution areas to each other,
the channels for the reaction gases in the active area are each bounded by a surface of one of the profiled dividing plates and a surface of the gas diffusion layer,
a first one of the channels for the reaction gas in an inlet area of the active area has the impermeable first dividing plate that separates and divides the first one of the channels for the reaction gas into two volume regions and extends in a flow direction, wherein only one volume region of the first one of the channels for the reaction gas is adjacent to the gas diffusion layer,
the second main gas port is provided next to a first one of the two main gas ports in the distribution area to supply the reaction gas to the first one of the channels,
one of the two volume regions that is adjacent to the gas diffusion layer is connected to the first one of the two main gas ports, and
a second one of the two volume regions that is not adjacent to the gas diffusion layer is connected to a second one of the two main gas ports.

2. The fuel cell stack according to claim 1, further comprising a plurality of impermeable dividing plates that are arranged downstream of the impermeable first dividing plate in the first one of the channels, wherein the impermeable dividing plates are arranged to be spaced apart from each other.

3. The fuel cell stack according to claim 2, wherein starting from the inlet area of the first one of the channels, each successive impermeable dividing plate after the impermeable first dividing plate has a lesser length than the respective preceding impermeable dividing plate.

4. The fuel cell stack according to claim 1, wherein the impermeable first dividing plate runs parallel to the gas diffusion layer.

5. The fuel cell stack according to claim 1, wherein the volume regions established by the impermeable first dividing plate are designed to permit an equal flow volume of reaction gas.

6. The fuel cell stack according to claim 1, wherein the channels run in a straight line.

7. The fuel cell stack according to claim 1, wherein a second one of the channels for reaction gases has an impermeable first dividing plate in the inlet area of the active area that separates and divides the second one of the channels into two volume regions and extends in the flow direction, wherein only one volume region of the second one of the channels is adjacent to the gas diffusion layer,
a second main gas port is provided next to a first one of two main gas ports in the distribution area to supply the reaction gas to the second one of the channels,
one of the two volume regions that is adjacent to the gas diffusion layer is connected to the first one of the two main gas ports, and
a second one of the two volume regions that is not adjacent to the gas diffusion layer is connected to a second one of the two main gas ports.

8. The fuel cell stack according to claim 1, wherein the fuel cell stack includes polymer-electrolyte membranes.

9. A fuel cell system comprising:
a fuel cell stack, the fuel cell stack including:
gas diffusion layers; and
bipolar plates, each bipolar plate including:
an impermeable first dividing plate; and
two profiled dividing plates, each profiled dividing plate having:
an active area,
two distribution areas, each distribution area including two main gas ports for supply and removal of reaction gases from the active area, and a coolant main port for supply of coolant to the active area and removal of coolant from the active area, and
a second main gas port provided in one of the two distribution areas, wherein:
the profiled dividing plates are formed and arranged one over the other such that the respective bipolar plate has separate channels for the reaction gases and the coolant that connect the main gas ports for the reaction gases and the coolant main port of the two distribution areas to each other,
the channels for the reaction gases in the active area are each bounded by a surface of one of the profiled dividing plates and a surface of the gas diffusion layer,
a first one of the channels for the reaction gas in an inlet area of the active area has the impermeable first dividing plate that separates and divides the first one of the channels for the reaction gas into two volume regions and extends in a flow direction, wherein only one volume region of the first one of the channels for the reaction gas is adjacent to the gas diffusion layer,
the second main gas port is provided next to a first one of the two main gas ports in the distribution area to supply the reaction gas to the first one of the channels,
one of the two volume regions that is adjacent to the gas diffusion layer is connected to the first one of the two main gas ports, and
a second one of the two volume regions that is not adjacent to the gas diffusion layer is connected to a second one of the two main gas ports.

10. The fuel cell system according to claim 9, comprising at least one humidifier that is configured to humidify a portion of at least one reaction gas.

11. The fuel cell system according to claim 9, wherein the impermeable first dividing plate runs parallel to the gas diffusion layer.

12. The fuel cell system according to claim 9, wherein the volume regions established by the impermeable first dividing plate are designed to permit an equal flow volume of reaction gas.

13. The fuel cell system according to claim 9, wherein the channels run in a straight line.

14. The fuel cell system according to claim 9, further comprising a plurality of impermeable dividing plates that are arranged downstream of the impermeable first dividing plate in the first one of the channels, wherein the impermeable dividing plates are arranged to be spaced apart from each other.

15. The fuel cell system according to claim 14, wherein starting from the inlet area of the first one of the channels, each successive impermeable dividing plate after the impermeable first dividing plate has a lesser length than the respective preceding impermeable dividing plate.

\* \* \* \* \*